US012749942B2

(12) United States Patent
Berres

(10) Patent No.: US 12,749,942 B2
(45) Date of Patent: Sep. 29, 2026

(54) ELECTRIC MOTOR-DRIVEN ACTUATION DEVICE FOR MOTOR VEHICLE APPLICATIONS

(71) Applicant: KIEKERT AG, Heiligenhaus (DE)

(72) Inventor: Michael Berres, Cologne (DE)

(73) Assignee: KIEKERT AG, Heiligenhaus (DE)

( * ) Notice: Subject to any disclaimer, the term of this patent is extended or adjusted under 35 U.S.C. 154(b) by 180 days.

(21) Appl. No.: 18/292,418

(22) PCT Filed: Aug. 17, 2022

(86) PCT No.: PCT/DE2022/100608

§ 371 (c)(1),
(2) Date: Jan. 26, 2024

(87) PCT Pub. No.: WO2023/020662

PCT Pub. Date: Feb. 23, 2023

(65) Prior Publication Data

US 2024/0250573 A1 Jul. 25, 2024

(30) Foreign Application Priority Data

Aug. 19, 2021 (DE) ..................... 10 2021 121 544.7

(51) Int. Cl.
*H02K 5/08* (2006.01)
*H02K 7/116* (2006.01)

(52) U.S. Cl.
CPC ............ *H02K 5/08* (2013.01); *H02K 7/1166* (2013.01)

(58) Field of Classification Search
CPC .. H02K 5/08; H02K 5/04; H02K 5/02; H02K 5/10; H02K 5/225; H02K 7/1166
USPC ........................................................... 310/43
See application file for complete search history.

(56) References Cited

U.S. PATENT DOCUMENTS 5,564,308 A * 10/1996 Hoshikawa ............. E05B 81/74 292/201
5,746,076 A * 5/1998 Inoue ...................... E05B 81/54 292/216
5,909,918 A * 6/1999 Kowalewski ........... E05B 81/34 292/201
(Continued)

FOREIGN PATENT DOCUMENTS

DE 19755497 C1 * 7/1999 ......... B29C 66/1224
DE 19908155 A1 8/2000
(Continued)

OTHER PUBLICATIONS

Machine translation of DE-19755497-C1. (Year: 1999).*
International Search Report mailed Nov. 11, 2022, for priority International Application No. PCT/DE2022/100608.

*Primary Examiner* — Michael Andrews
(74) *Attorney, Agent, or Firm* — Renner, Otto, Boisselle & Sklar

(57) ABSTRACT

An electric motor-driven actuation device for motor vehicle applications, comprising an at least two-piece housing that is made of plastic and includes a body and a cover. Furthermore, an electric motor is arranged in the housing. In addition, at least one metal contact assembly for the electric motor is provided. According to the invention, the electric motor and the contact assembly define a unit that can be pre-assembled and be jointly placed in a housing cavity accommodating the unit.

15 Claims, 3 Drawing Sheets

(56) References Cited

U.S. PATENT DOCUMENTS

| | | | | |
|---|---|---|---|---|
| 2013/0154402 | A1* | 6/2013 | Basavarajappa ......... | H02K 5/10 310/20 |
| 2014/0292003 | A1* | 10/2014 | Nishio .................... | E05B 81/54 292/201 |
| 2015/0035300 | A1* | 2/2015 | Taylor ....................... | E05B 9/00 74/89 |
| 2016/0126680 | A1* | 5/2016 | Maeda ............... | H02K 11/0094 439/620.21 |
| 2020/0266683 | A1* | 8/2020 | Hirabayashi ......... | H02K 7/1166 |
| 2022/0029502 | A1* | 1/2022 | Nishio ...................... | B60S 1/08 |

FOREIGN PATENT DOCUMENTS

| | | | |
|---|---|---|---|
| DE | 202010012379 | U1 | 12/2011 |
| DE | 102016103647 | A1 | 9/2017 |
| DE | 112016006089 | T5 | 9/2018 |

* cited by examiner

ELECTRIC MOTOR-DRIVEN ACTUATION DEVICE FOR MOTOR VEHICLE APPLICATIONS

This application is a national phase of International Patent Application No. PCT/DE2022/100608 filed Aug. 17, 2022, which claims priority to German Patent Application No. 10 2021 121 544.7 filed Aug. 19, 2021, each of which is hereby incorporated herein by reference in its entirety.

FIELD OF DISCLOSURE

The invention relates to an electric motor-driven actuation device for motor vehicle applications, having an at least two-piece housing made of plastic with a body and cover, further having an electric motor arranged in the housing, and having at least one metal contact assembly for the electric motor.

BACKGROUND OF DISCLOSURE

Electric motor-driven actuation devices for motor vehicle applications are used for very different types of actuating processes. For example, such actuation devices are used in connection with a central locking system, as described in detail in DE 199 08 155 A1. There, an electric motor housed in a two-piece housing is realized, to which contacts are assigned. However, the exact connection between the contacts and the electric motor, and the installation of these components in the housing, remain open.

With the aid of the electric motor, a push rod is moved linearly via a transmission. Using the push rod, a locking and unlocking of various flaps can be carried out, such as a locking and unlocking of a glove compartment, a locking and unlocking of motor vehicle doors, a rear gate, or even a fuel tank cover. More recently, such actuators can also be used to lock and unlock covers in conjunction with charging sockets on hybrid and/or electric cars, for example.

The further prior art according to DE 197 55 497 C1 relates to a control unit housing made of plastic for a motor vehicle for accommodating a printed circuit board. The housing is made up of interconnected housing elements that are joined together by laser welding. Since such electric motor-driven actuation devices are generally exposed to changing environmental conditions or also moisture and dust, the tight closure of such housings is particularly important.

The generic prior art according to DE 10 2016 103 647 A1 relates to a closing aid device, i.e., a tightening drive for a motor vehicle lock. The electric motor-driven actuation device realized here is equipped with a two-piece housing with a body and a cover. In addition, an electric motor is located in the interior of the housing in conjunction with associated plug contacts. The electric motor and the plug contacts define a pre-assembled unit. For this purpose, the plug contacts are accommodated in an additionally provided insert element which then forms, in conjunction with the electric motor, a unit that can be pre-assembled. As a result, the assembly is simplified overall, and the sealing of the housing against the ingress of moisture can be improved at the same time.

The prior art—in particular, according to the generic DE 10 2016 103 647 A1—has fundamentally proven its effectiveness with regard to combining the electric motor including the contact assembly to form a single unit. However, for this purpose, the plug contacts are equipped with an additional insert element. Together with a drive connection and the drive or electric motor, the plug contacts including the insert element define a unit capable of being pre-assembled. However, this unit is relatively bulky and has many parts, which can cause problems during installation. This is where the invention comes in.

SUMMARY OF DISCLOSURE

The invention is based upon the technical problem of further developing such an electric motor-driven actuation device for motor vehicle applications in such a way that the overall assembly is simplified, and any adjustments can be made easily.

In order to solve this technical problem, the invention proposes, starting from a generic electric motor-driven actuation device, that the electric motor and the contact assembly define a unit capable of being pre-assembled which is jointly positioned in a housing cavity that accommodates the unit.

In the context of the invention, the unit capable of being pre-assembled is thus substantially reduced to the two elements of the electric motor on the one hand and the metal contact assembly for the electric motor on the other. On the one hand, the unit capable of being pre-assembled can thereby be implemented particularly quickly and easily, because only the electric motor and the contact arrangement have to be combined for this purpose. On the other hand, this unit capable of being pre-assembled can then easily be positioned in the housing or the housing cavity accommodating the unit. Finally, in this connection, it then generally remains only to close the housing. The contacting of the electric motor in the housing then takes place via the metal contact assembly, which can be connected to a corresponding plug for this purpose. In this way, no additional contacting measures are required.

In addition, here, the metal contact assembly is the only conductor element which electrically connects the electric motor accommodated in the interior of the housing to a plug. Different electrical connections between the plug on the one hand and the electric motor on the other can thereby be realized without difficulty and in a simple manner. This is because, if, for example, a differently constructed plug is to be used, it is generally only necessary to adapt the metal contact assembly on the output side to the modified plug, while the connection to the electric motor can be retained on the input side. In any case, the metal contact assembly can be easily adapted to particular requirements with regard to the plug used in practice.

Against the background, this is of particular importance, since such electric motor-driven actuation devices typically perform very different tasks and consequently must be included in the electrical architecture of the motor vehicle to be produced. The problem here is often that the car manufacturer requires specific plug connector types for contacting the electric motor-driven actuation device. According to the invention, these possibly different plug types can now be taken into account in that, for adaptation, only the metal contact assembly has to be exchanged, whereas the housing and the electric motor, and also the procedure during assembly and pre-assembly, are retained. These are the main advantages.

According to a further advantageous embodiment, the metal contact assembly is generally designed as a stamped sheet metal part. Such a stamped sheet metal part can be produced simply, cost-effectively, and flexibly, and is thus particularly suitable for the described use. Furthermore, the invention deliberately dispenses with an additional insert element, differing from the generic prior art according to DE 10 2016 103 647 A1, so that any adaptation to a different plug type is limited solely to the replacement of the metal contact assembly or the stamped sheet metal part.

In order that the unit, capable of being pre-assembled, made of the electric motor and the contact assembly be able to be properly accommodated in the housing, the housing cavity is generally designed in two pieces in the body, with a motor cavity and a contact cavity, which are connected to one another. That is, the housing cavity is, advantageously and usually, provided in the body and not in the cover. In addition, the housing cavity is designed in two pieces, viz., the motor cavity for receiving and holding the electric motor on the one hand, and the contact cavity for receiving and holding the metal contact assembly or the stamped sheet metal part on the other. In this connection, the stamped sheet metal part or the metal contact assembly is accommodated in the typically shaft-shaped contact cavity. In contrast, the motor cavity is generally designed to be hollow-cylindrical, taking into account the typically cylindrical shape of the electric motor.

The body is generally also designed in two parts with a motor body and a plug body, which are connected to one another. The electric motor is accommodated in the motor body, or in the motor cavity in the motor body. In contrast, the plug body generally has the contact cavity, so that the metal contact assembly or the stamped metal part is arranged and held in the usually shaft-shaped contact cavity in the plug body. The plug body is usually equipped with a plug opening at the end. The external plug is accommodated in the plug opening and electrically connected to the contact assembly.

In this connection, it has proven to be particularly advantageous if the unit, capable of being pre-assembled, made up of the electric motor and the contact assembly is inserted perpendicularly into the motor cavity and contact cavity, or the housing cavity. That is, a worker producing the unit consisting of an electric motor and a metal contact assembly then uses the housing cavity in the body such that the unit, pre-assembled or capable of being pre-assembled, is inserted into the relevant housing cavity, and in perpendicular fashion. As a result, no complicated alignment measures are required, and the assembly is particularly simple and intuitive.

The cover for closing the body is generally also designed in two pieces, with a motor cover and a plug cover. The motor cover and the plug cover are connected to one another. In this connection, the design is also such that the motor cover closes the motor body, and the plug cover closes the plug body. That is, the motor cover closes the motor body with the motor cavity located therein, in which the electric motor of the unit capable of being pre-assembled is located. In contrast, the closure of the plug body is done with the aid of the plug cover, which in turn has the contact cavity in which the metal contact assembly of the unit capable of being pre-assembled is accommodated and guided. Since the contact cavity is also designed in a shaft-like manner, the metal contact assembly or the stamped metal part is generally held therein in a non-positively or at least partially positively fitting manner after the assembly of the unit made up of the electric motor and the contact arrangement.

This has the result that, after the body is closed by the cover, the contact assembly can be contacted directly thereafter with the plug of the particular desired embodiment. In this connection, the contact assembly generally has two plug pins which, like the contact assembly, are held in the shaft-shaped contact cavity in a positively fitting or at least non-positively fitting manner overall. As a result, a bending of the two plug pins when the plug is subsequently inserted into the plug opening remaining in the housing is prevented, and a flawless contact can be expected.

In fact, the motor cover closes the motor body, and the plug cover closes the plug body. In addition, the cover and the body are connected to one another by an adhesive bond. In fact, a hermetic seal is observed between the cover and the body, except for the previously mentioned plug opening, and possibly an actuator opening. In order to close the plug opening and the actuator opening in a moisture-tight and dust-tight manner, the plug opening and the actuator opening advantageously each have an inserted seal.

As a result, in this way an electric motor-driven actuation device for motor vehicle applications is provided and realized that can be produced particularly easily and provides a simple adaptation to different plug connectors to be connected. The housing accommodating the electric motor-driven actuation device is moreover hermetically sealed, so that the electric motor-driven actuation device according to the invention can be used in and on a motor vehicle for practically any actuating and drive process, and in particular also in regions which are exposed to environmental influences. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
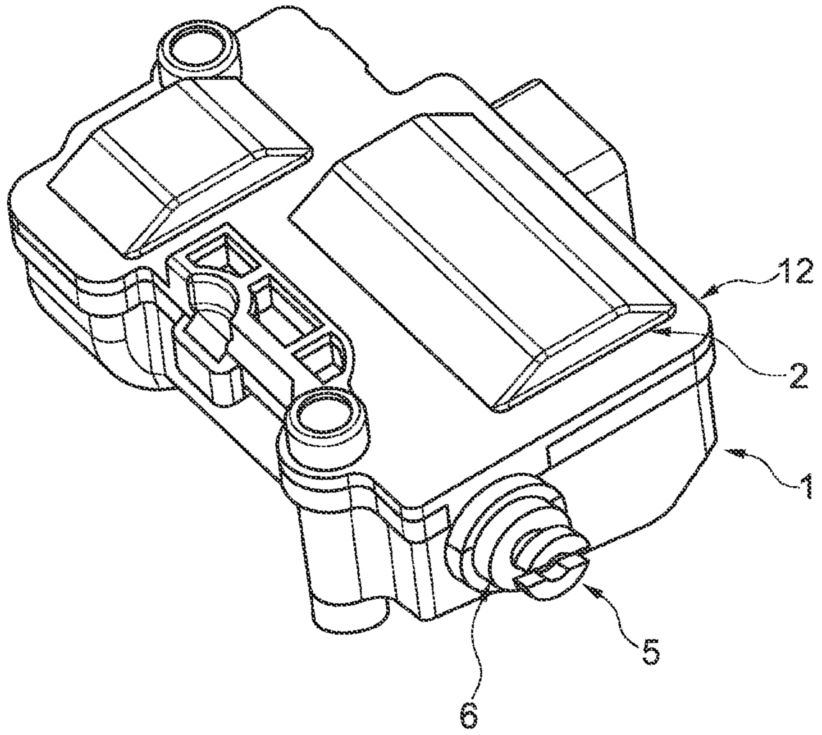
FIG. 1 shows the electric motor-driven actuation device according to the invention schematically in a first embodiment.

The figures show an electric motor-driven actuation device for automotive applications. For this purpose, the electric motor-driven actuation device initially has an at least two-piece housing 1, 2 made of plastic. According to the embodiment, the housing 1, 2 is composed of a body 1 and a cover 2. An electric motor 3 is arranged in the housing 1, 2. The electric motor 3 has on its output shaft a (driven) worm 4 mounted thereon and connected thereto, which worm meshes with a worm wheel (not shown) in order to be able to move and retract an actuating element 5 (shown only in FIG. 1) linearly, into and out of the housing 1, 2. It can be seen from FIG. 1 that the actuating element 5, for this purpose, passes through a seal 6 in a corresponding actuating element opening in the housing 1, 2. The detailed design of the electric motor including downstream transmission with worm 4 and actuating element 5 can here be realized and implemented as described in the utility model DE 20 2010 012 379 U1 of the applicant, to which reference is expressly made.

Figure 2:
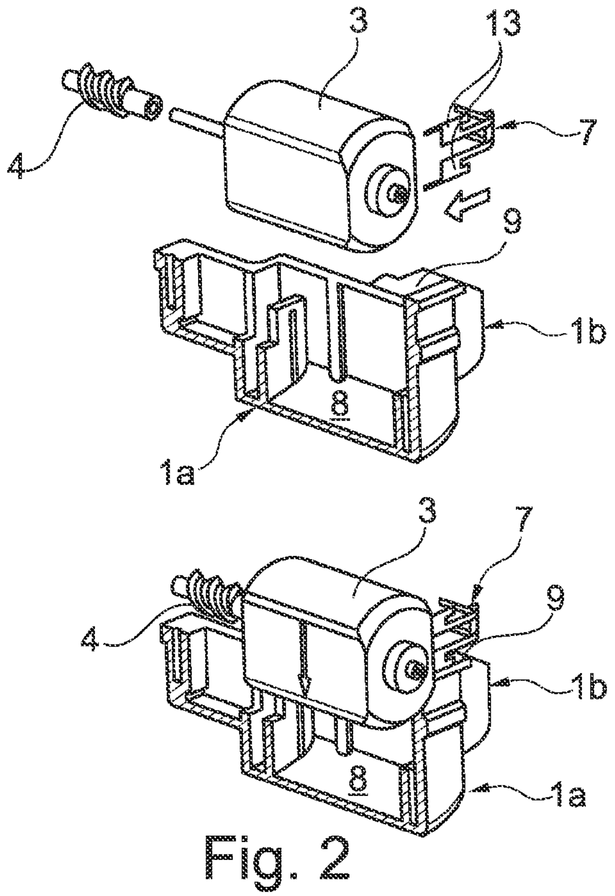
FIGS. 2 and 3 show the actuation device according to FIG. 1 in a modified variant in the course of assembly.
Figure 3:
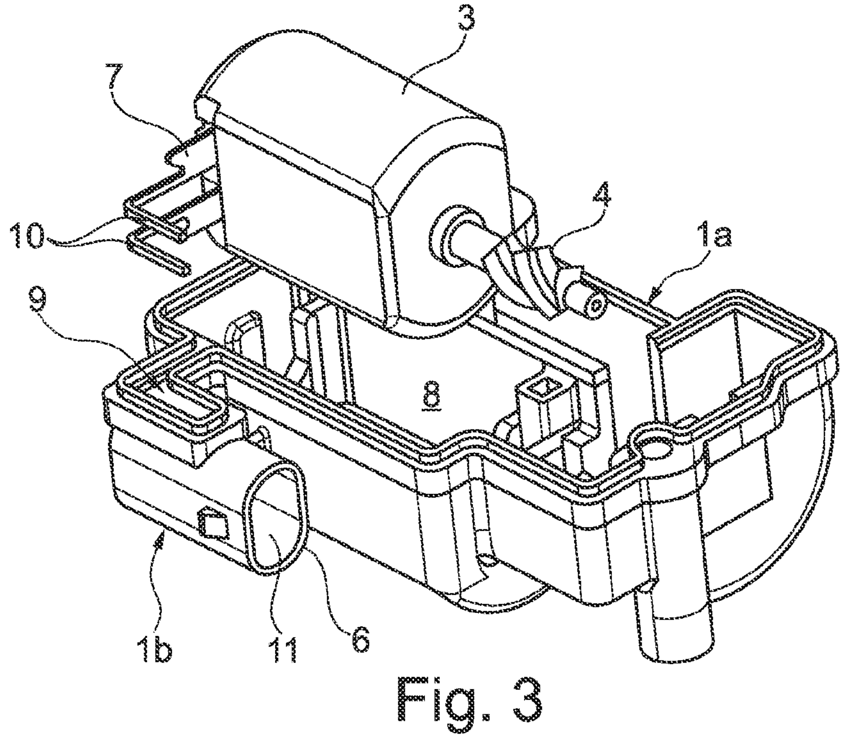

It can be seen from FIGS. 2 and 3 that, according to the invention, the electric motor 3 and a metal contact assembly 7 define a unit 3, 7 capable of being pre-assembled. The unit 3, 7 capable of being pre-assembled is positioned overall in a housing cavity 8, 9 accommodating the unit 3, 7. From a comparative view of FIGS. 2 to 4, it can be seen that the housing cavity 8, 9 consists of a motor cavity 8 and a contact cavity 9, which are connected to each other. The body 1 of the housing 1, 2 is also designed in two pieces with a motor body 1*a* and a plug body 1*b*. The motor body 1*a* and the plug body 1*b* are also connected to one another. Overall, the design is such that the motor cavity 8 is realized and arranged in the motor body 1*a*, and the contact cavity 9 in the plug body 1*b*.

The cover 2 also has a two-piece design with motor cover 2*a* and plug cover 2*b*. The motor cover 2*a* and the plug cover 2*b* are also connected to one another. With the aid of the motor cover 2*a*, the motor body 1*a* is closed with the motor cavity 8 located therein and the electric motor 3 accommodated therein. In contrast, the plug cover 2*b* serves to close the plug body 1*b*, in the interior of which the contact cavity 9 is located for accommodating and holding the metal contact assembly 7. The metal contact assembly 7 is actually a stamped sheet metal part.

In addition, the design is such that the unit 3, 7, capable of being pre-assembled, made up of the electric motor 3 and the contact assembly 7 is inserted or plugged into the housing cavity 8, 9 perpendicularly as a whole, as can be seen from FIGS. 2 and 3. The assembled state is characterized by the fact that the metal contact assembly 7 or the stamped sheet metal part implemented here is accommodated overall at least partially in a positively fitting and/or non-positively fitting manner in the shaft-like contact cavity 9. This allows different plugs to be defined on plug pins 10 at the end of the contact arrangement 7, which plugs can be inserted for this purpose via a plug opening 11 in the plug body 1*b* and contacted with the relevant plug pins 10.

As is the actuator opening for the actuating element 5 already mentioned above, the plug opening 11 is also equipped with a seal 6 in order to be able to ensure a hermetically sealed closure of the housing 1, 2 formed in this way after the body 1 and the cover 2 have been joined. For this purpose, the cover 2 and the body 1 are connected to one another by an adhesive bond 12. The adhesive bond 12 according to the exemplary embodiment is in fact a laser-welded connection 12, as can be seen in particular in a comparison of FIGS. 1 and 4. In the implementation of the laser welding connection 12 between the body 1 and the cover 2, the hermetic seal of the housing 1, 2 is realized, except for the plug opening 11 already mentioned above and, if applicable, the actuating element opening with the actuating element 5 which is thereby guided towards the outside with the interposition of the seal 6.

FIGS. 2 and 3 provide a particularly good illustration of the assembly or pre-assembly of the unit 3, 7, which can be pre-assembled, made up of the electric motor 3 and the metal contact assembly 7, or the stamped sheet metal part realized there. First, in a first step shown in the upper part of FIG. 2, the metal contact assembly 7 is electrically connected to the electric motor 3. This corresponds to the fact that the metal contact assembly 7 or the stamped sheet metal part is coupled to the electric motor 3 via an electrical plug connection. In addition, the electric motor 3 is equipped with the previously described worm 4 on its output shaft.

It can be seen that the metal contact assembly 7 is L-shaped overall. As a result, the contact assembly 7 can be equipped on the one hand with the plug pins 10 for final contact with the plug (not shown), and on the other with motor contacts 13 at the opposite end. According to the exemplary embodiment, the metal contact assembly 7 is composed, in a non-limiting manner, of two metal conductors spaced apart from one another. The two conductors can be pre-assembled and held in position with the aid of an electrically insulating spacer. For this purpose, the spacer is made of plastic. Here, it is possible to hold the metal conductors in position with the spacer via a clip connection. A sliding connection with the spacer is also conceivable, as is the possibility of equipping the two metal conductors with the aid of the spacer using a plastic overmolding process.

The motor contacts 13 on the one leg of the L are accommodated in plug-in shoes for contacting the electric motor 3. Since the contact assembly or the stamped metal part 7 is L-shaped, the plug pins 10 on the other L-leg are not damaged here.

The unit 3, 7 pre-assembled in this way, made up of the electric motor 3 and the contact assembly 7, is then positioned in the housing cavity 8, 9, viz., by the electric motor 3 being inserted into the motor cavity 8 and the contact assembly 7 into the contact cavity 9. The process, shown in the lower part of FIG. 2, of plugging the unit 3, 7 vertically into the relevant housing cavity 8, 9 corresponds to this. This is indicated by a corresponding vertically oriented arrow, which represents this vertical plug connection.

Since, following the L-shape of the contact assembly 7, the contact cavity 9 also has a corresponding L-shaped design, the front-side plug pins 10 of the contact assembly 7 are thereby supported within the L-shaped contact cavity 9 in the assembled state. This is because, when the plug, which is not shown, is inserted into the plug opening 11, the contact assembly 7 as a whole can be supported on the wall inside the L-shaped contact cavity 9, which is oriented perpendicularly to the insertion direction. In this way, the contact assembly 7 or the stamped sheet metal part is held at least in a non-positively fitting and usually also at least partially positively fitting manner in the contact cavity 9 in the assembled state of the unit 3, 7. This prevents any bending or kinking of the plug connector pins 10. It is also possible to optionally complete the electric motor 3 or the housing 1, 2 with differently designed contact assemblies 7 to form the unit 3, 7 capable of being pre-assembled.

In fact, different contact assemblies 7 can be easily realized, while retaining the motor contacts 13. It can be seen that the motor cover 2*a*, as a component of the cover 2, closes the motor body 1*a* with the electric motor 3 accommodated there in the motor cavity 8. The plug cover 2*b* connected to the motor cover 2*a* in turn ensures that the plug body 1*b* is closed thereby. Inside the plug body 1*b* is situated the contact cavity 9 with the metal contact assembly 7 accommodated therein.

Figure 4:
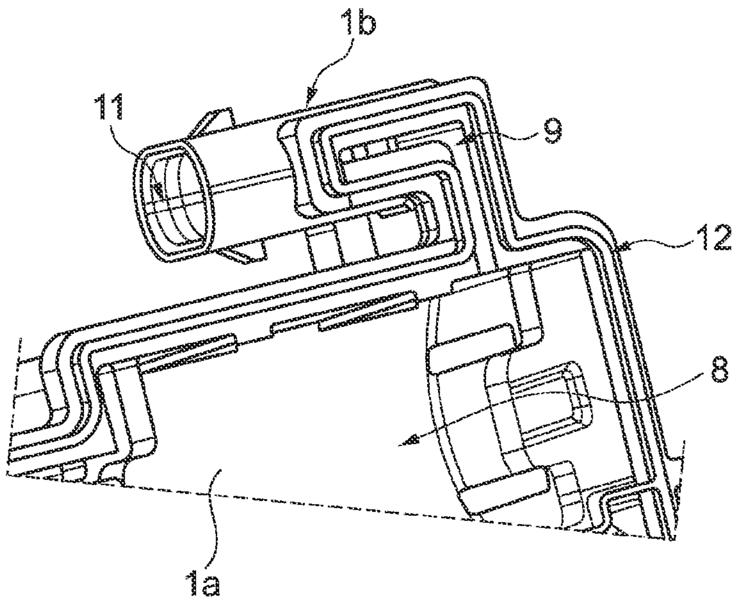
FIG. 4 shows the body of the housing in sections prior to the assembly of the cover.
Figure 5:
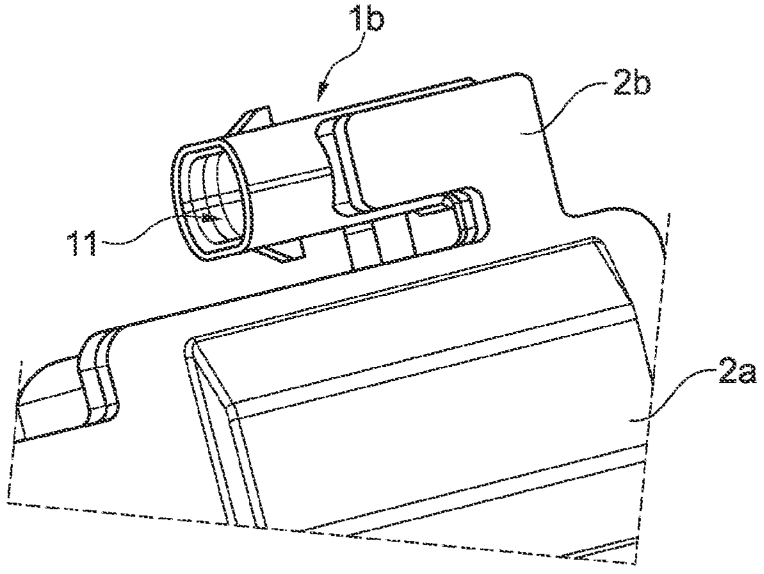
FIG. 5 shows the subject matter according to FIG. 4 with assembled cover.

A comparison of FIGS. 4 and 5 shows that the plug cover 2*b* covers only the contact cavity 9 and does not reach a front-side area of the plug body 1*b* with the plug opening 11 provided there, or that the plug opening 11 as a whole is a component of the plug body 1*b*—without plug cover 2*b*. This achieves a particularly tight and one-piece closure of the plug (which is not shown), which is accommodated in the plug opening 11 with interposition of the seal 6.

LIST OF REFERENCE SIGNS

1 Body
1*a* Motor body
1*b* Plug body
1, 2 Housing
2 Cover
2*a* Motor cover
2*b* Plug cover
3 Electric motor
3, 7 Unit
4 Driven worm

5 Actuating element
6 Seal
7 Contact assembly
8 Motor cavity
8, 9 Housing cavity
9 Contact cavity
10 Plug pins
11 Plug opening
12 Adhesive bond, laser-welded connection
13 Motor contacts

The invention claimed is:

1. An electric motor-driven actuation device for motor vehicle applications, the actuation device comprising:

an at least two-piece housing made of plastic including a first piece comprising body that defines a housing cavity, and a second piece constituting a cover, an electric motor, and at least one metal contact assembly for the electric motor, wherein the electric motor and the metal contact assembly define a unit that is pre-assembled for jointly positioning the electric motor and the metal contact assembly in the housing cavity of the body of the first piece of the housing, wherein the at least one metal contact assembly includes a stamped sheet metal part, a plurality of plug pins, and a plurality of motor contacts, wherein the electric motor and the at least one metal contact assembly are configured for pre-assembly by inserting the motor contacts into the electric motor such that the at least one metal contact assembly is fixed to the electric motor, and wherein the unit is configured to be pre-inserted into the housing cavity with fixed relative positions of the electric motor and the metal contact assembly in the housing cavity of the body of the first piece of the housing when the first piece and the second piece of the two-piece housing are separated.

2. The actuation device according to claim 1, wherein the housing cavity has two areas including a motor cavity that houses the motor and a contact cavity that houses the metal contact assembly, and the motor cavity and the contact cavity are connected to one another.

3. The actuation device according to claim 2, wherein the body has two pieces including a motor body and a plug body, which are connected to one another.

4. The actuation device according to claim 3, wherein the motor cavity is arranged in the motor body, and the contact cavity is arranged in the plug body.

5. The actuation device according to claim 4, wherein the cover has two pieces including a motor cover and a plug cover, which are connected to one another.

6. The actuation device according to claim 5, wherein the motor cover closes the motor body to cover the motor cavity, and the plug cover closes the plug body to cover the contact cavity.

7. The actuation device according to claim 2, wherein the unit is inserted perpendicularly into the motor cavity and the contact cavity.

8. The actuation device according to claim 2, wherein the metal contact assembly includes two bendable plug pins that are held in the metal contact cavity.

9. The actuation device according to claim 1, wherein the body and the cover are hermetically sealed up to a plug opening by an adhesive connection.

10. The actuation device according to claim 9, wherein the plug opening has a seal.

11. The actuation device according to claim 9, wherein the body and the cover further are hermetically sealed up to an actuating element opening by the adhesive connection.

12. The actuation device according to claim 11, wherein the adhesive connection is a laser-welded connection.

13. The actuation device according to claim 11, wherein the plug opening and the actuator opening each has a seal.

14. The actuation device according to claim 9, wherein the adhesive connection is a laser-welded connection.

15. The actuation device according to claim 1, wherein the plug pins extend from the stamped sheet metal part to form an L-shape.

* * * * *